US007581919B2

(12) United States Patent
Bolzani

(10) Patent No.: US 7,581,919 B2
(45) Date of Patent: Sep. 1, 2009

(54) UNIVERSAL METHOD FOR THE QUICK LAYER PALLETIZATION OF OBJECTS AND RELATIVE SYSTEM WITH ROLLUP PLANES

(75) Inventor: Dante Bolzani, Traversetolo (IT)

(73) Assignee: Feon Societa' a Responsabilita' Limitata, Colorno (Parma) (IT)

( * ) Notice: Subject to any disclaimer, the term of this patent is extended or adjusted under 35 U.S.C. 154(b) by 245 days.

(21) Appl. No.: 11/587,249

(22) PCT Filed: Apr. 26, 2005

(86) PCT No.: PCT/IB2006/000085

§ 371 (c)(1),
(2), (4) Date: Oct. 23, 2006

(87) PCT Pub. No.: WO2006/126043

PCT Pub. Date: Nov. 30, 2006

(65) Prior Publication Data

US 2008/0050216 A1     Feb. 28, 2008

(30) Foreign Application Priority Data

May 23, 2005   (IT) .................. RE2005A0059

(51) Int. Cl.
B65G 1/18   (2006.01)
B65G 57/22  (2006.01)

(52) U.S. Cl. .................. 414/799; 414/927; 414/791.6; 414/792.8; 414/793.1

(58) Field of Classification Search ............. 198/429, 198/632, 861.2; 254/112; 269/289 MR; 414/789.5, 791.6, 792.6, 792.8, 793.4, 793.5, 414/793.6, 799, 927; 475/145, 158, 263, 475/269, 325, 331, 335, 340; 74/29, 31, 74/33, 422, 89.11, 89.17, 89.18, 89.19
See application file for complete search history.

(56) References Cited

U.S. PATENT DOCUMENTS 2,941,799 A * 6/1960 Reincke .................. 271/92
3,876,060 A * 4/1975 Stease .................... 198/632
4,108,061 A * 8/1978 Bowser .................... 100/7
4,809,965 A * 3/1989 Vander Meer et al. ........ 271/11

(Continued)

FOREIGN PATENT DOCUMENTS

CH    675574 A5 * 10/1990
EP    195241 A2 *  9/1986
FR    2 427 977      1/1980

(Continued)

Primary Examiner—Gregory W Adams
(74) Attorney, Agent, or Firm—Browdy and Neimark, P.L.L.C.

(57) ABSTRACT

A method for the quick palletization of objects (100), comprising the steps of:
  arranging objects (100) to be palletized organized on a collection plane (400);
  loading said objects (100) onto a flexible support plane (31) suitable for advancing in the direction of transfer of the objects (100) in a position substantially coplanar to the collection plane (400) and in continuation of it, so that the support plane (31) receives said objects without sliding;
  transferring said objects (100) from the support plane (31) to a flexible moving plane (21) that can slide coplanar to the support plane (31) so as to replace the latter (31) below the objects (100) whilst they remain stationary, in which the transfer takes place by synchronously activating the harmonious sliding of the support plane (31) and transfer plane (21) arranged in contact with each other in continuation of one another;
  taking the transfer plane (21) with the objects (100) on top above a pallet;
  making the transfer plane (21) slide under the objects (100), kept stationary, to transfer them onto the pallet.

26 Claims, 17 Drawing Sheets

U.S. PATENT DOCUMENTS

| | | | |
|---|---|---|---|
| 4,993,907 A * | 2/1991 | Clark | 414/795.3 |
| 5,868,549 A * | 2/1999 | Lee et al. | 414/791.6 |
| 6,402,455 B1 * | 6/2002 | Vincent et al. | 414/789.5 |
| 6,533,533 B1 * | 3/2003 | Heston | 414/791.6 |
| 7,393,176 B2 * | 7/2008 | Bolzani | 414/799 |
| 2005/0265816 A1 * | 12/2005 | Blanc | 414/799 |
| 2005/0265817 A1 * | 12/2005 | Blanc | 414/799 |

FOREIGN PATENT DOCUMENTS

| | | |
|---|---|---|
| FR | 2 756 550 | 6/1998 |
| JP | 57131635 A * | 8/1982 |
| WO | 2006000847 | 1/2006 |

* cited by examiner

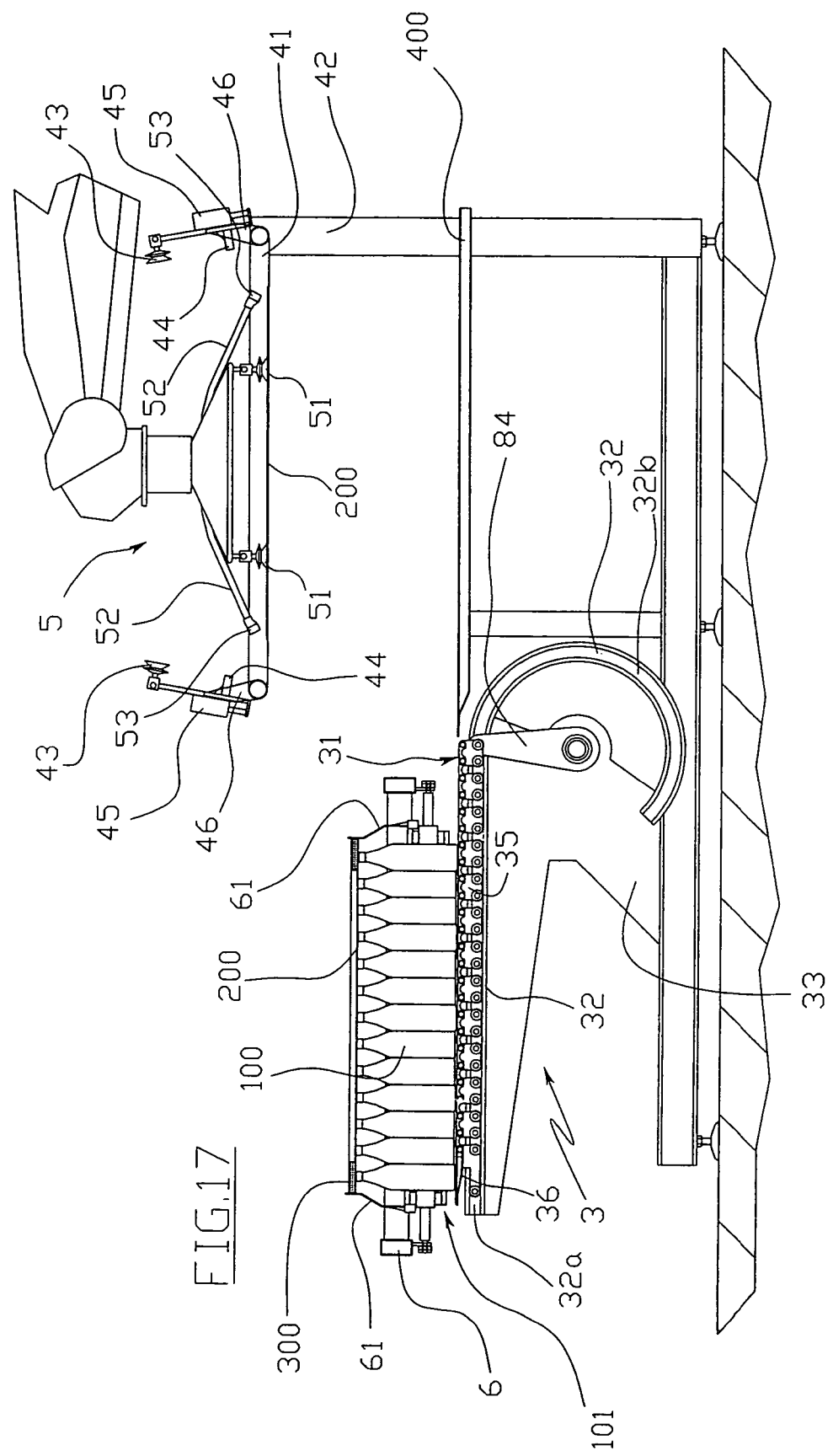

7,581,919 B2

UNIVERSAL METHOD FOR THE QUICK LAYER PALLETIZATION OF OBJECTS AND RELATIVE SYSTEM WITH ROLLUP PLANES

TECHNICAL FIELD

The present invention refers to a universal method and relative system for the quick palletization of loose or packaged objects of whatever shape and type, like for example, bottles, cans, packets, cartons, bundles, etc. Palletization consists of organizing and arranging goods so as to make it possible to use loading pallets in the transportation and storage of the goods themselves.

PRIOR ART

As known, in order to carry out palletization palletizers are used that comprise a thruster suitable for transferring a layer of objects to be palletized from a collection plane to a moving apparatus that takes care of arranging them on a pallet.

After having arranged the layer on the pallet, so as to form a first layer, a covering layer, generally of cardboard, is applied, through pick-up and release means, onto which it is possible to arrange another layer of objects, picked up in the same way as the first layer, and so on for every layer of objects to be loaded.

Once the formation of the pallet is complete, a protective framework is sometimes arranged over the last layer of objects complete with covering layer.

Such operations carried out with palletizers of the prior art require, overall, a time equal to the sum of the times necessary to carry out each operation, since each of them only begins after having completed the previous operation.

Indeed, the thruster, after having loaded the layer of objects onto the moving head, must go outside working area before the moving head can move away from the loading zone, and before another layer of objects is arranged on the collection plane.

Moreover, each covering layer can be arranged on the layer only after the moving apparatus has arranged the layer on the pallet and has gone outside working area, so as not to interfere with the covering layer depositing means, during work.

DESCRIPTION OF THE INVENTION

The purpose of the present invention is to provide a method for palletization that is able to carry out the necessary operations for the correct arrangement of the objects on top of the pallet in a more effective and efficient way with respect to the prior art, so as to carry out the complete palletization in substantially faster times, within the framework of a simple and rational solution.

A further purpose is to provide a system suitable for carrying out such a method and that at the same time is compact and reliable.

Such purposes are accomplished through a method for the quick palletization of objects in accordance with claim 1 and a system according to claim 10.

The dependent claims outline preferred and particularly advantageous embodiments of the palletization method and of the system according to the invention.

BRIEF DESCRIPTION OF THE DRAWINGS

Further characteristics and advantages of the invention shall become clearer from reading the following description provided as a non-limiting example, with the help of the figures illustrated in the attached tables, in which:

FIGS. 9-17 show in succession the operative steps for the palletization of objects through the system of the present invention with the addition of a storage station for covering sheets and frameworks.

WAY OF CARRYING OUT THE INVENTION

Figure 1:
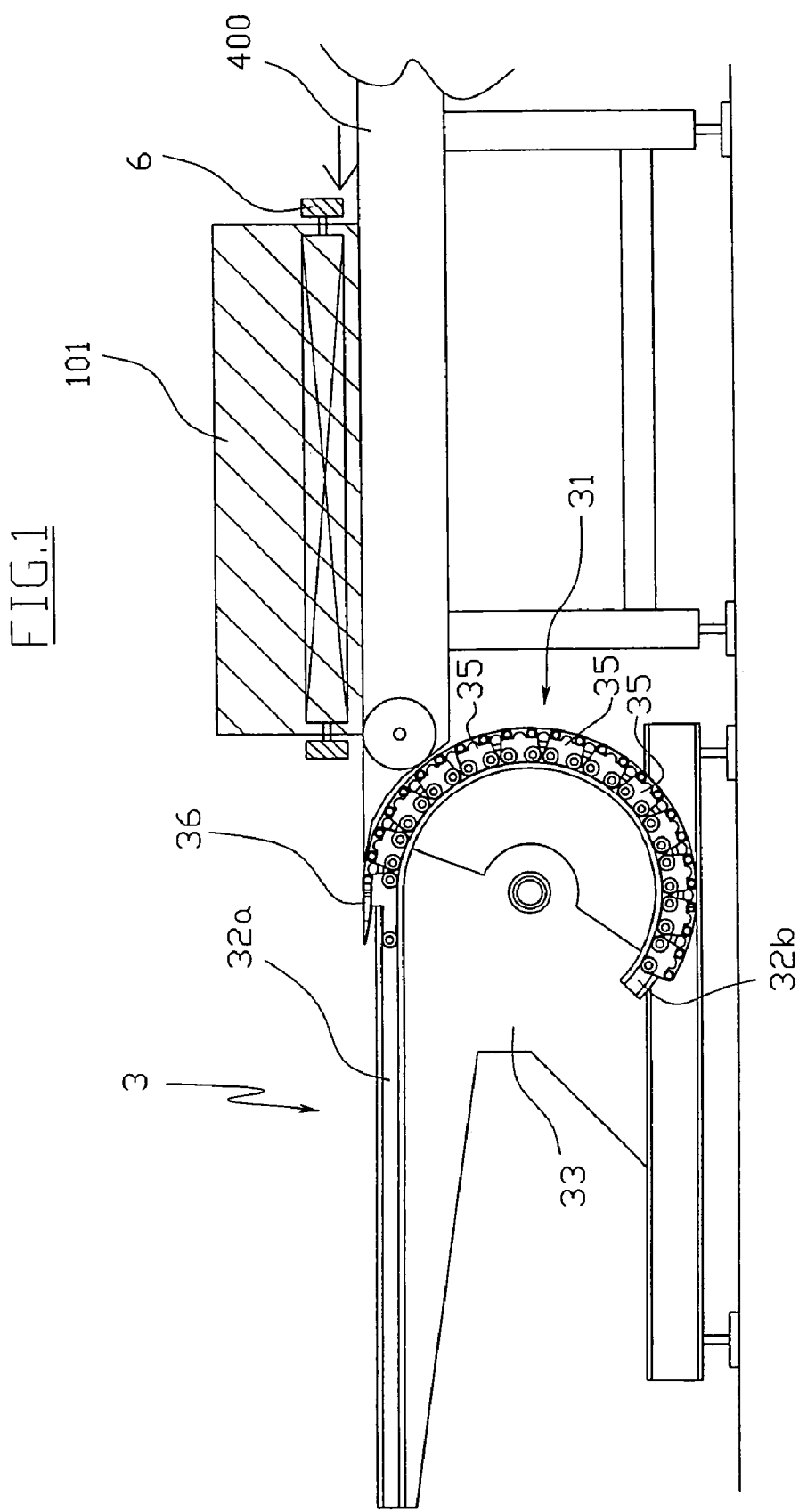
FIGS. 1-6 show in succession the operative steps for the palletization of objects through a system for quick palletization in accordance with the present invention.
Figure 2:
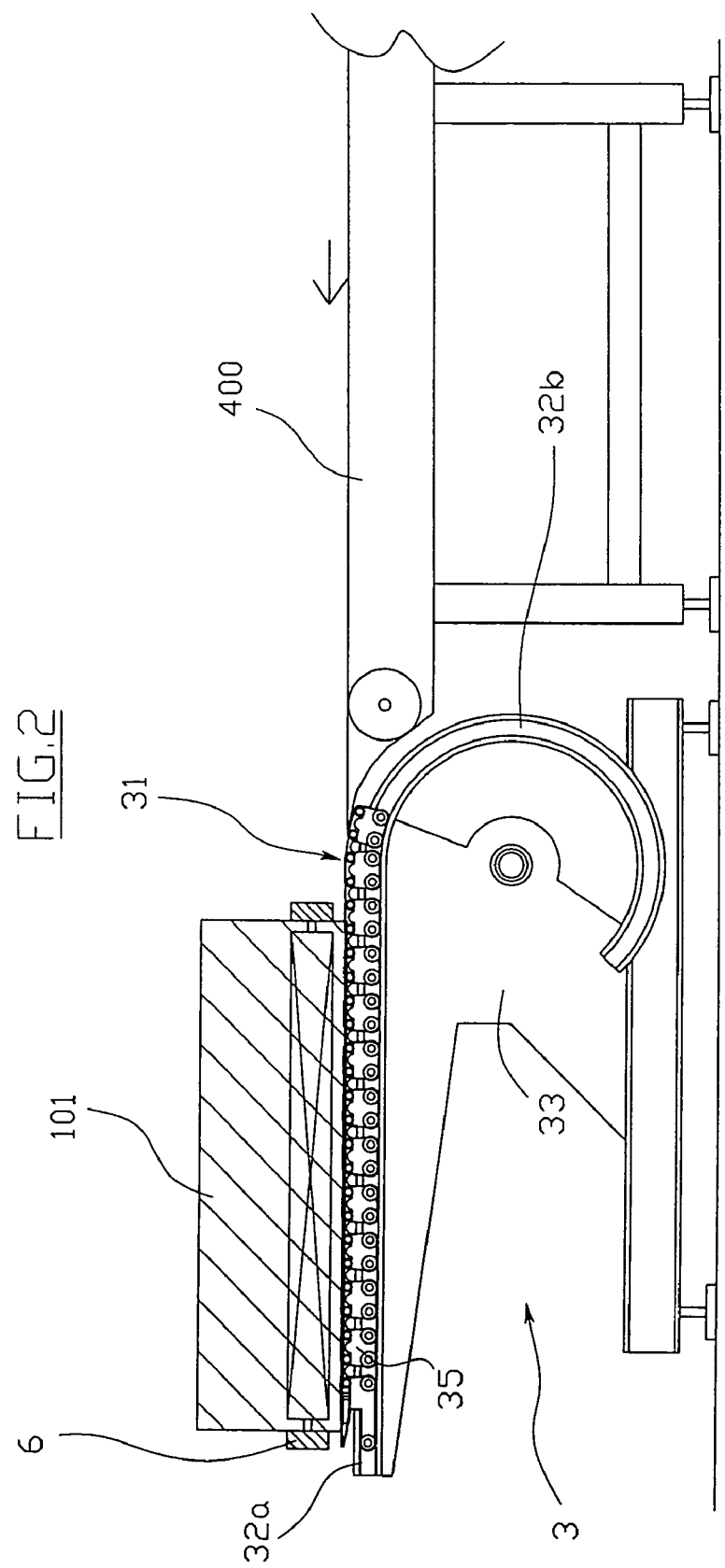
Figure 3:
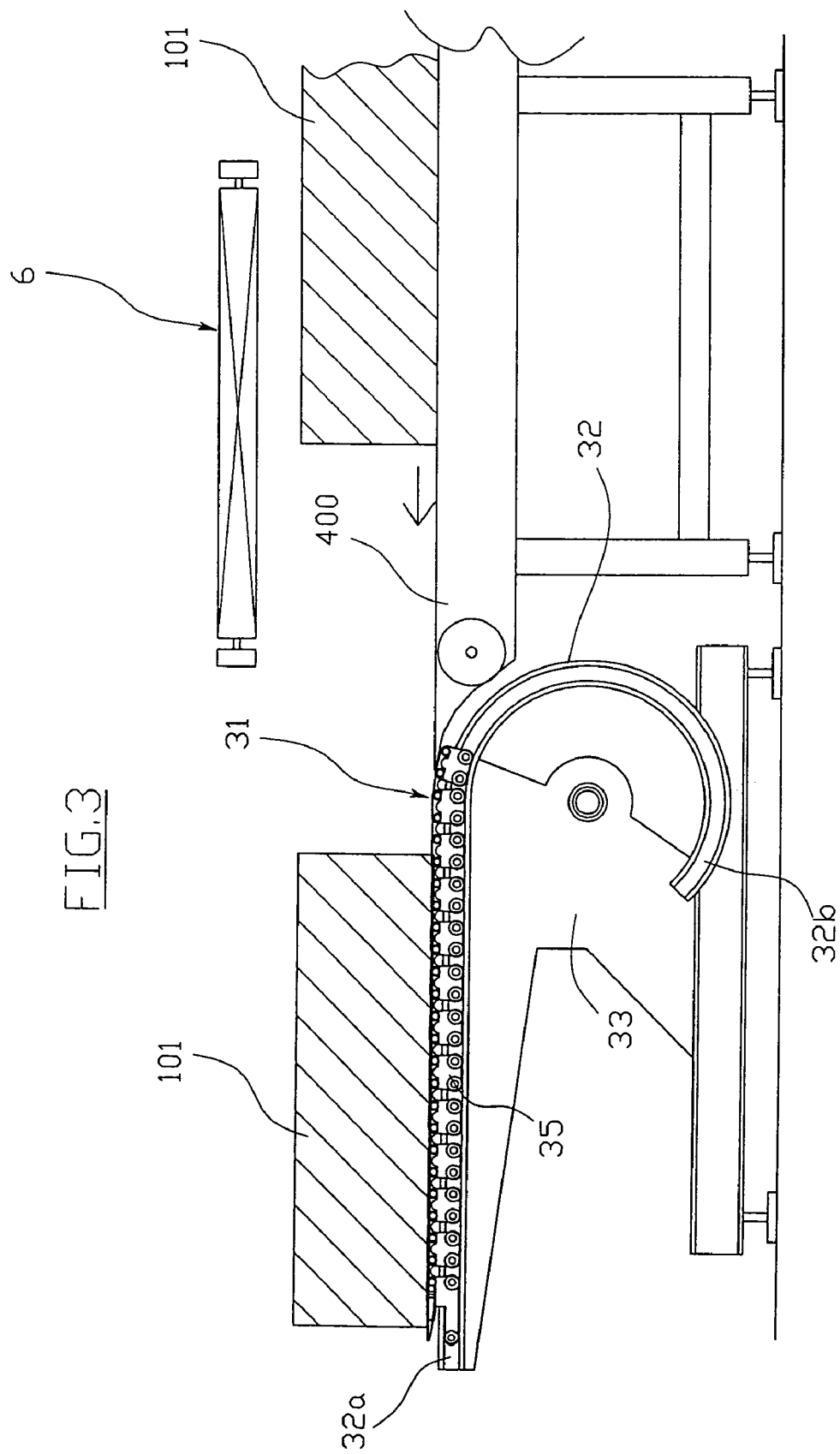

With reference to the aforementioned figure, a system for the quick palletization of objects in accordance with the present invention is globally indicated with 1.

By objects to be palletized we mean products suitable for being palletized both in the form of products that are loose and those in some way already packaged.

Said system 1 basically comprises a mobile moving head 2 (FIGS. 5-7, 13-15) and a fixed support body 3 respectively provided with a first and a second flexible plane 21, 31, suitable for respectively sliding on a pair of opposite and parallel guides 22, 32, in which each pair is associated with a respective frame structure 23, 33, suitable for being fixed to a moving system, for example a robot.

In particular, each guide 22, 32 extends along a first horizontal portion 22a, 32a and a second circumferential portion 22b, 32b consecutive to each other.

In the example, each guide 22, 32 is in the form of a C-shaped throat in which the lateral flanks of the planes 21, 31 slide.

In particular, the plane 21 slides inside the throats 22, whereas the plane 32 slides over the throats 31.

The planes 21, 31 can slide between a horizontal laid out position in which they support a layer 101 of objects 100 (FIGS. 9-17) to be palletized and a collection position in which they let it fall by gravity.

In the laid out position, the planes 21, 31 occupy the horizontal portions 22a, 32a, whereas in the collection position they occupy the circumferential portions 22b, 32b, of the respective pair of throats 22, 32.

The actuation of the planes 21, 31 to slide along the respective pairs of opposite throats 22, 32 is carried out through suitable actuation means, globally indicated with 24, 34, for the sake of simplicity illustrated only in FIGS. 4-8, which we shall discuss more later on.

In the illustrated example, each of the two flexible planes 21, 31 is formed from a plurality of cylindrical rods 70 (FIG. 8) arranged in parallel, perpendicular to the direction of sliding, and kept together through two opposite chains 71.

Moreover, the rods of the plane 31 that can slide between the guides 32 are completely supported above them, through suitable brackets 35.

The sliding in the throats 22, 32 is made easier by suitable bearings 72 fitted at the ends of each rod 70 near to the chains 71.

Figure 8:
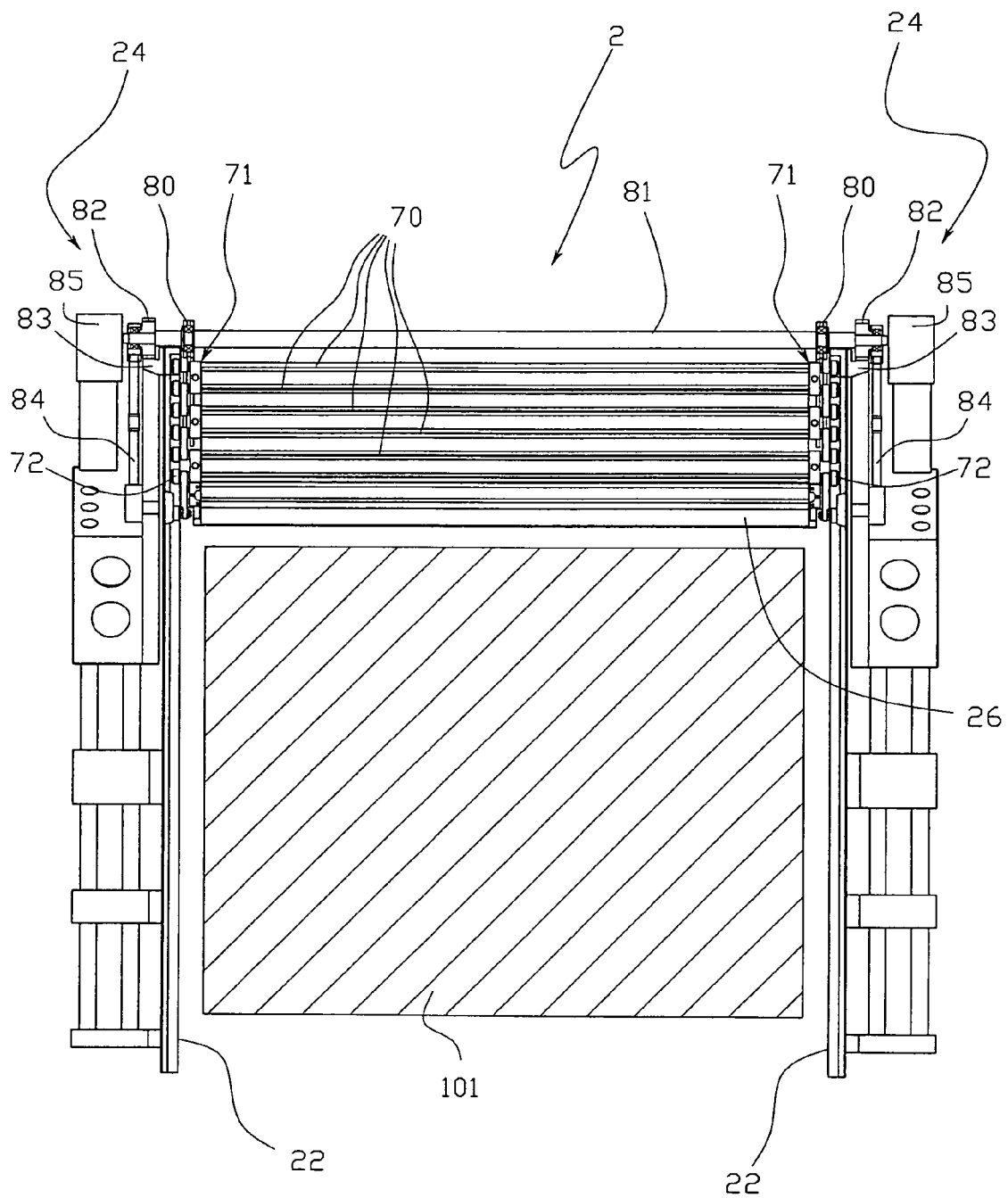
FIG. 8 shows a view of the pick-up system along the line VIII-VIII of FIG. 4.

Of course, the flexible plane 21 or 31 can be made through a single body, just as the sliding in the throats 22, 32 can be carried out without the use of bearings 72. The actuation means 24, 34, illustrated in greater detail just for the transfer head 2 in FIG. 8, are in the form of a pair of connecting rods 80 associated at one end with the flexible plane 21, 31 and at the other end fixed to a drawbar 81 at the ends of which two mobile pinions 82 are fitted that engage a pair of parallel racks 83 extending on the outside of the circumferential portion 22b, 32b of the throats 22, 32.

The pinions 82 are kept constantly engaged with the racks 83 through a pair of rigid arms 84, which act as spacers, hinged on the flanks of the frame structure 23, 33 at the axis that connects the centers of the two opposite circumferential portions 22b, 32b.

Basically, the sliding of the plane 21 or 31 in the throats 22 or 32, occurs by actuating the pinions 82 in rotation, which rotate on the racks 83 drawing the plane 21 or 31 connected through the connecting rods 80 to the drawbar 81.

The actuation of the pinions 82 takes place through two synchronized geared motors 85. For flexible planes made from light material it is possible to use a single geared motor.

For a more detailed description of the flexible plane formed from rods and of the actuation means we refer to application PCT/IB2005/001124 to the same applicant.

In accordance with the present invention, the support body 3 receives a layer 101 to be piled on a pallet (not illustrated) and the moving head 2 takes the layer 101 of objects from the support body 3 and, moving away from the support body 3, places it on the pallet or on a pile of layers of objects arranged on the pallet.

In particular, the transfer of the layer 101 from the support body 3 to the moving head 2 is carried out by placing the moving head 2 on top of the layer 101 with its plane 21 in the collection position. By coordinating the actuation of the actuation means 24, 34 and by coordinating the harmonious sliding of the two planes 21, 31, the layer 101 passes from the support body 3 to the moving head 2. This occurs by ensuring that whilst the plane 31 of the support body 3 moves below the layer 101 from the laid out position to the collection position, the plane 21 of the moving head 2 follows it and moves below the layer 101 from the collection position to the laid out position to support and carry the layer 101.

In order to easily receive the layer 101 to be palletized from thrusting means, the support body 3 is fixed to the floor so as to be able to arrange the sliding plane 31 coplanar to a collection plane 400.

In the example (FIGS. 1-5), the thrusting means are in the form of a translator-centrer 6.

With reference to FIGS. 1 to 5, operatively, the collection plane 400, which is in the form of a conveyor belt that carries the objects in a direction parallel to the sliding of the plane 31, provides the translator-centrer 6, near to the support body 3, with a layer 101 to be palletized that is loaded on top of the plane 31 of the support body 3.

In particular, the translator-centrer 6 is provided with two pairs of opposite arms suitable for being brought together and apart to surround and compact a precise amount of objects, predefined by the user, making the system according to the invention extremely flexible, since it is possible to load layers of whatever size.

During the compacting and loading operation of the layer 101, the plane 400 provides a layer 101 (FIG. 4) close to the support body 3 and therefore the plane is stopped.

Figure 5:
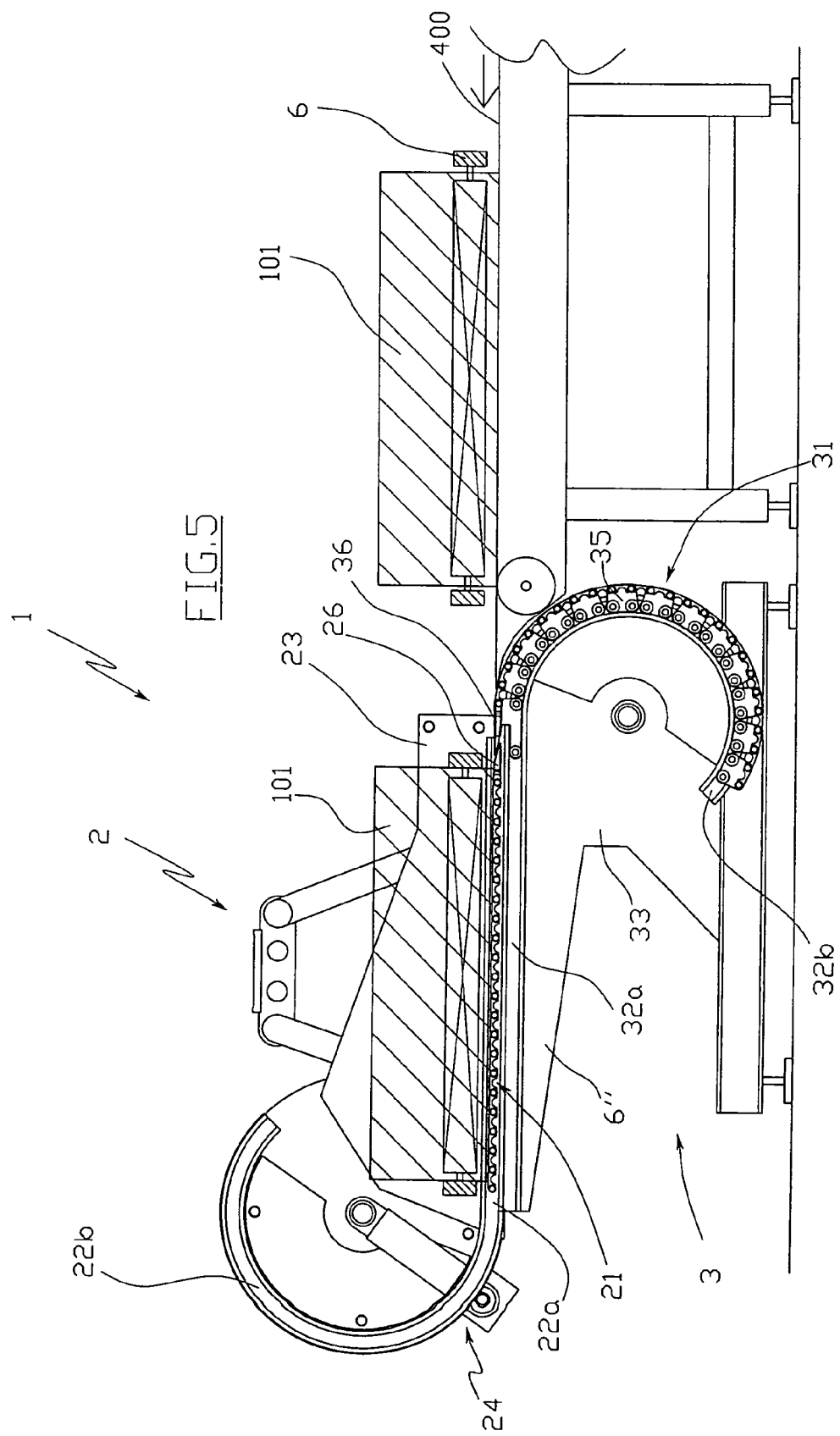
Figure 6:
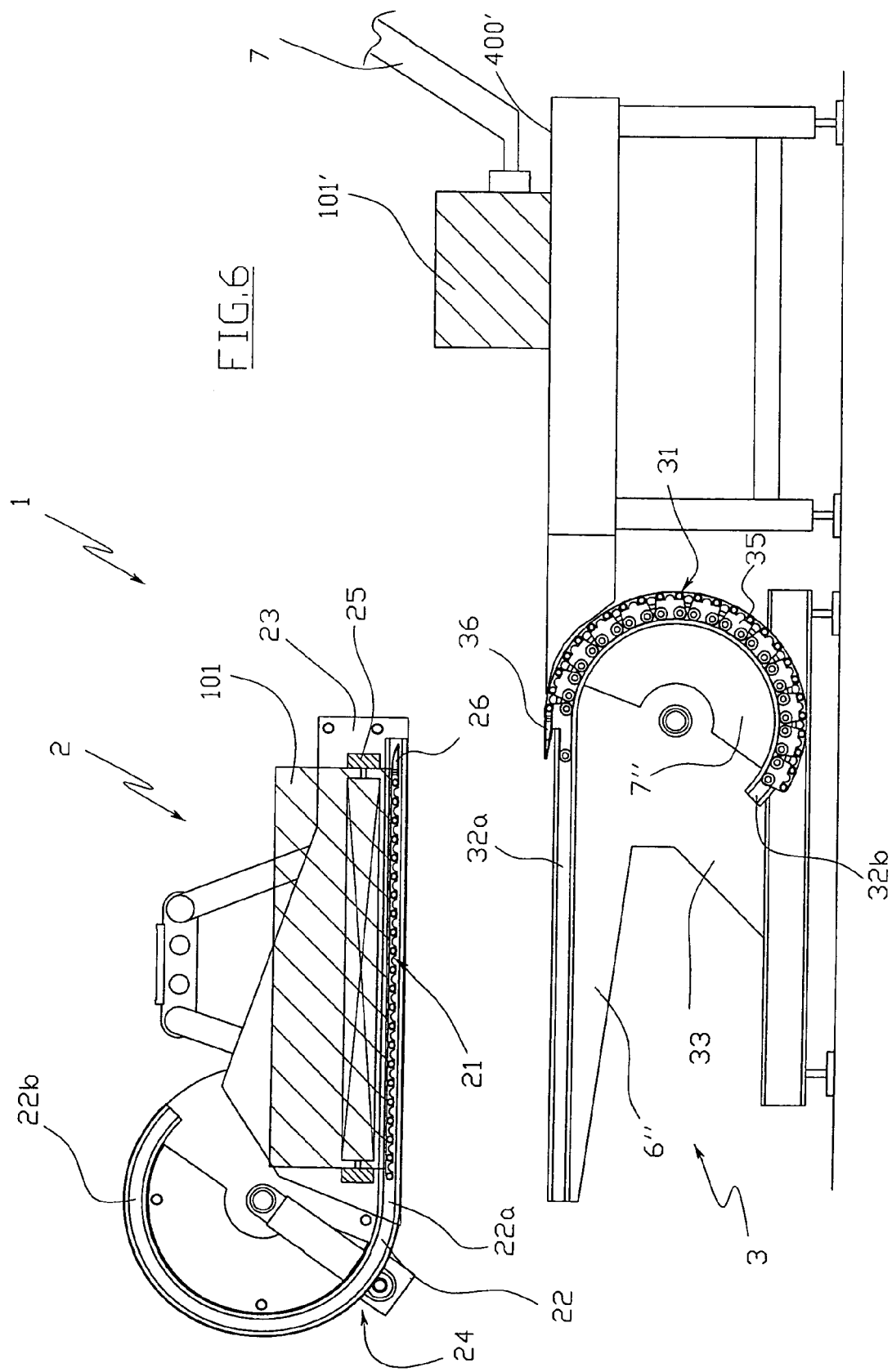

The translator-centrer 6 is ready to go down and compact the layer 101 (FIG. 5). Once compacting has been carried out clamping the layer 101 to be loaded with the mobile arms, the translator-centrer 6 translates towards the support body 3 (FIG. 1). The loading of the layer 101 onto the support body 3 is carried out by making the plane 31 of the support body 3 slide, through the moving means 34 (FIG. 7), from the collection position (FIG. 1) to the laid out position (FIG. 2), moving in the same direction and at the same speed at which the translator-centrer 6 translates, so as to receive the layer 101 without sliding.

In particular, the translation of the translator-centrer takes place in synchrony with the sliding of the plane 31, therefore the plane 31 goes into the laid out position whilst the translator-centrer 6 carries out the loading of the layer 101.

Once the loading of the layer 101 has ended, the translator-centrer 6 goes back, to repeat the same operations (FIG. 3), over the collection plane 400, which in the meantime provides a new layer 101 to be compacted near to the support body 3.

In practice, whilst the translator-centrer 6 releases the layer 101 lifting up to go back above the plane 400, the latter already takes care of the provision of another layer 101, near to the support body 3.

This allows the overall palletization times to be reduced.

Alternatively, it is possible to foresee loading the plane 31 of the support body 3 through a thrusting arm 7 (FIG. 6) that loads the layer 101 in many steps: a first group 101' of objects is provided by a plane 400' at the support body 3. In particular, the plane 400', in this case, advances in a direction perpendicular and not parallel to the direction of sliding of the plane 31. Such a first group 101' is loaded through the arm 7 on a first portion of plane 31, which during loading is made to advance by a sufficient portion, in synchrony and in a way in harmony with the thrusting arm 7; once the loading of the first group 101' of objects is complete, the arm 7 goes back into the previous position and the plane 400', at the support body 3, provides a second group of objects, not illustrated, which is loaded onto the plane 31 in the same way as the first group 101' and so on until a complete layer of objects to be palletized is formed.

This allows the size of the plane 400' to be reduced in the direction in which the thrusting arm 7 translates, as well as allowing the thrusting arm 7 to carry out a short and always identical stroke.

The transfer of the layer 101 from the support body 3 to the moving head 2 takes place through the exchange of planes 31, 21 below the layer 101.

Figure 4:
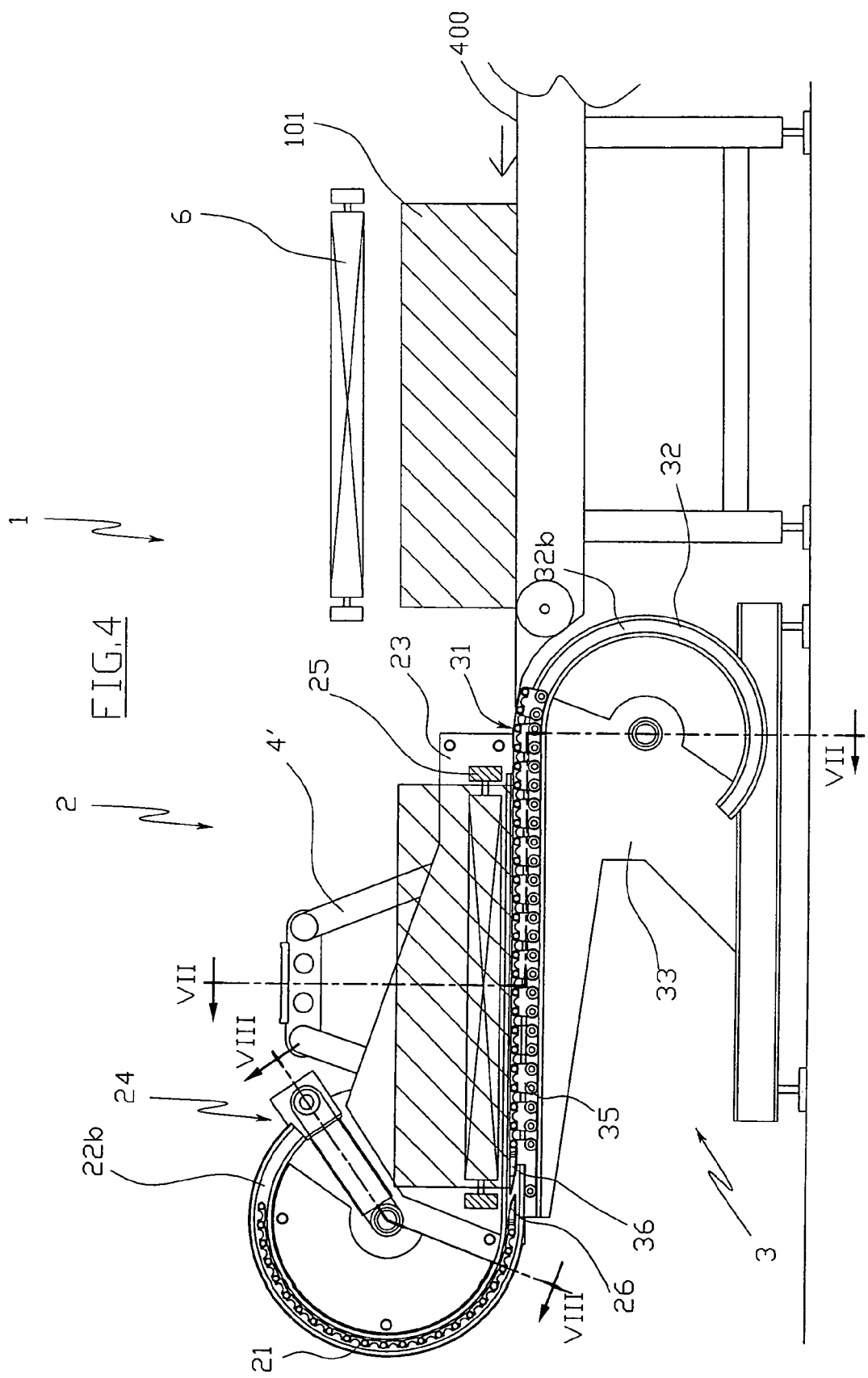

In particular, the moving head 2 is taken above the support body 3 with the respective horizontal portions 22a, 32a of the throats 22, 32 arranged parallel and at a distance such as to take the free ends of the two flexible planes 21, 31 into abutment with each other, with the plane 21 of the moving head 2 in collection position (FIG. 4).

At this point the actuation means 24, 34 of the planes 21, 31 are activated in synchrony taking the plane 21 of the moving head 2 into the laid out position and the plane 31 of the support body 3 into the collection position, so as to carry out the exchange between the two planes (FIG. 5). Such an operation is carried out keeping the free ends of the planes 21, 31 always in abutment. Basically, as the plane 21 of the moving head 2 is gradually laid down sliding below the layer 101, which stays still, the plane 31 of the support body 3 folds up leaving its place to the plane 21 of the moving head 2. The displacements of the two planes 21, 31 are coordinated so that the layer 101 is always supported.

At the same time, on the collection plane 400 a second layer 101 is prepared to be loaded onto the support body 3, as soon as the moving head 2 moves away.

Figure 7:
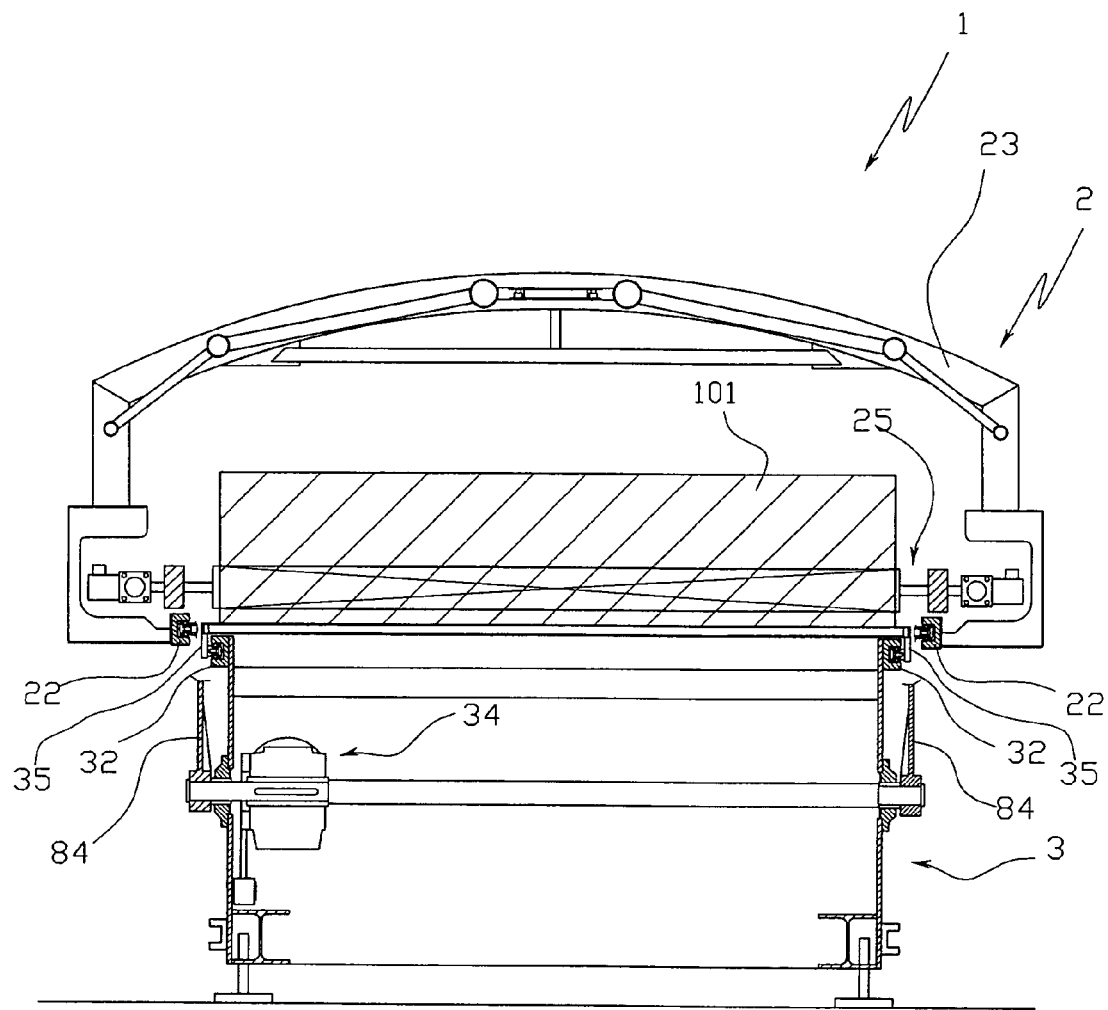
FIG. 7 shows a view of the pick-up system along the line VII-VII of FIG. 4.

As can clearly be seen in FIG. 7, the separation between the guides 22 of the moving head 2 is slightly more than the separation between the guides 32 of the support body 2, and the guides 32 are arranged below the guide 22.

Moreover, the rollers of the plane 31 that is able to slide between the guides 32 are completely supported above them, through the brackets 35, so as to be coplanar to the rollers of the plane 21 that is able to slide between the guides 22.

During the transfer step, in order to avoid the layer 101 being able to be carried by the plane 31 of the support body 3 that slides, it is foreseen to use suitable perimetric containment means 25 housed on the moving head 2 so as to hold the layer 101 still with respect to the sliding planes 21, 31.

Moreover, preferably, to make the transfer of the layer 101 even easier, the free ends of the two planes 21, 31 are provided with matching wedge-shaped elements 26, 36 suitable for cooperating in abutment, during the harmonious and coordinated sliding of the planes 21, 31 aligning their surfaces.

At the end of the transfer, the moving head 2 moves away (FIG. 6) from the support body 3 to take the layer 101 into the palletization zone. Here, the head 2 goes above a pallet or a layer 101 already piled on a pallet and, activating the actuation means 24, takes the plane 21 into the collection position laying down the layer 101. At the end of the release of the layer 101, the head 2 once again heads towards the support body 3 to repeat the same operations with another layer 101.

In order to make the palletization even faster, the system 1 comprises a storage station 4 (FIGS. 9-17) suitable for receiving covering layers 200 or frameworks 300 from suitable pick-up means, for example a robot 5.

In the example, the storage station 4, or simply store, is in the form of a frame 41, lying horizontally, slidably fixed to an upright 42 that goes up vertically from the floor. The frame 41 is arranged above the collection plane 400 on which the layer of objects to be palletized, in the example bottles 100, arrives through known drawing systems, and it is vertically mobile between a high position, in which it receives the covering layer 200 or the framework 300 from the robot 5 and a low position (FIG. 15), in which it releases it above the layer of bottles 100 below, as shall be described in greater detail hereafter.

Of course, it is possible for the covering layer 200 and the framework 300 to be picked up and released by the robot 5 at the store 4, through a single load.

In the example, suckers 43 and blocks 44 are associated with the frame 41 respectively to support the covering layer 200 and the framework 300 released by the robot 5.

Each sucker 43 is connected to a venturi valve that in the act of picking up the covering layer 200 creates and maintains a vacuum inside the sucker 43 to obtain a perfect grip of the covering layer 200. At the moment of release, the valve takes the recess between sucker 43 and covering layer 200 back "to pressure" thus making the latter fall.

In particular, the suckers 43 and the blocks 44 are hinged to the corners of the frame 41 itself, so as to be able to rotate between a position in which they support the covering layer 200 and/or the framework 300 released by the robot 5 (FIGS. 11-14), and a position outside working area in which they allow the robot 5 to arrange the covering layer 200 and/or the framework 300 inside the frame 41 (FIGS. 9, 10 and 16, 17).

The rotary movement of the suckers 43 and of the blocks 44 is carried out through known means.

In particular, the suckers 43 act upon the upper surface of the covering layers 200 whilst each block 44 is actuated by a jack 45, so as to laterally grip the framework 300 when it must be held.

In the example, each sucker 43 and each block 44 with relative jack 45 are fixed to a common arm 46 hinged at one end to the frame 41. Therefore, by actuating the arms 46 it is possible to take both the suckers 43 and the blocks 44 outside working area.

Moreover, the robot 5 is also provided with suckers 51 suitable for sticking onto the upper surface of the covering layer 200 and with arms 52 carrying, at the respective ends fastening means 53, schematized in the figures, for gripping the framework 300.

In order to load the support body 3 with the layer 101 of bottles 100, the translator-centrer 6 is used, which, before translating towards the plane 31, goes down onto the collection plane 400 and compacts the layer 101 of bottles 100 already prepared; during the descent of the translator-centrer 6 the covering layer 200 is laid down from the store 4 and, in the case of the last layer, the framework 300, as shall be described in greater detail hereafter.

Operatively and with reference to FIGS. 9-17, where the steps of palletization of the last two layers 101 of bottles 100 are illustrated in sequence, the following operations take place.

Figure 9:
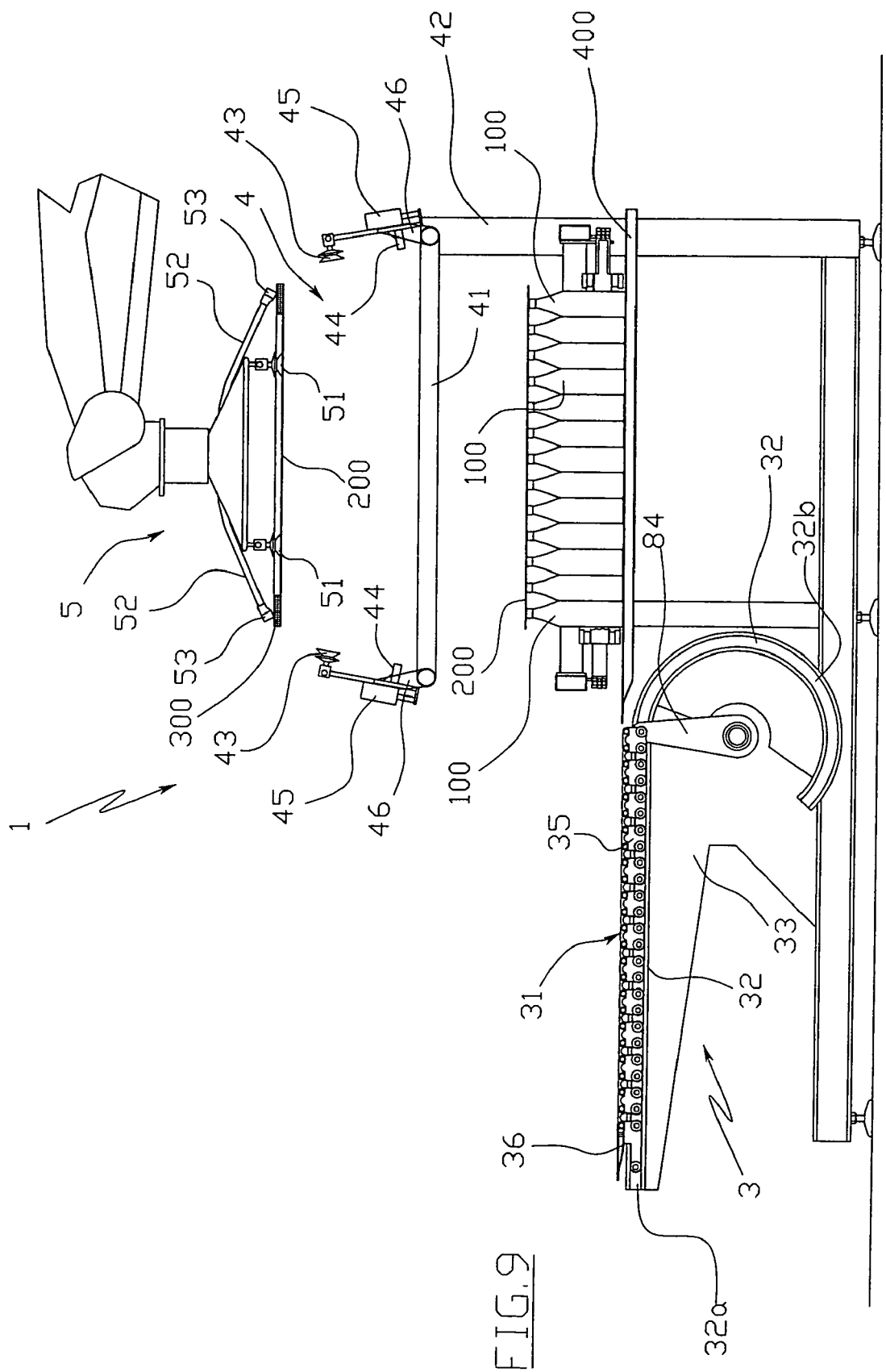

FIG. 9: the penultimate layer 101 of bottles 100 has been compacted on the collection plane 400 by the translator-centrer 6 and is ready to be transferred onto the support body 3 with the covering layer 200 already on top of the layer 101 of bottles 100. The robot 5 picks up a framework 300 and then a covering layer 200 and goes back above the store 4, which waits in the high position.

Figure 10:
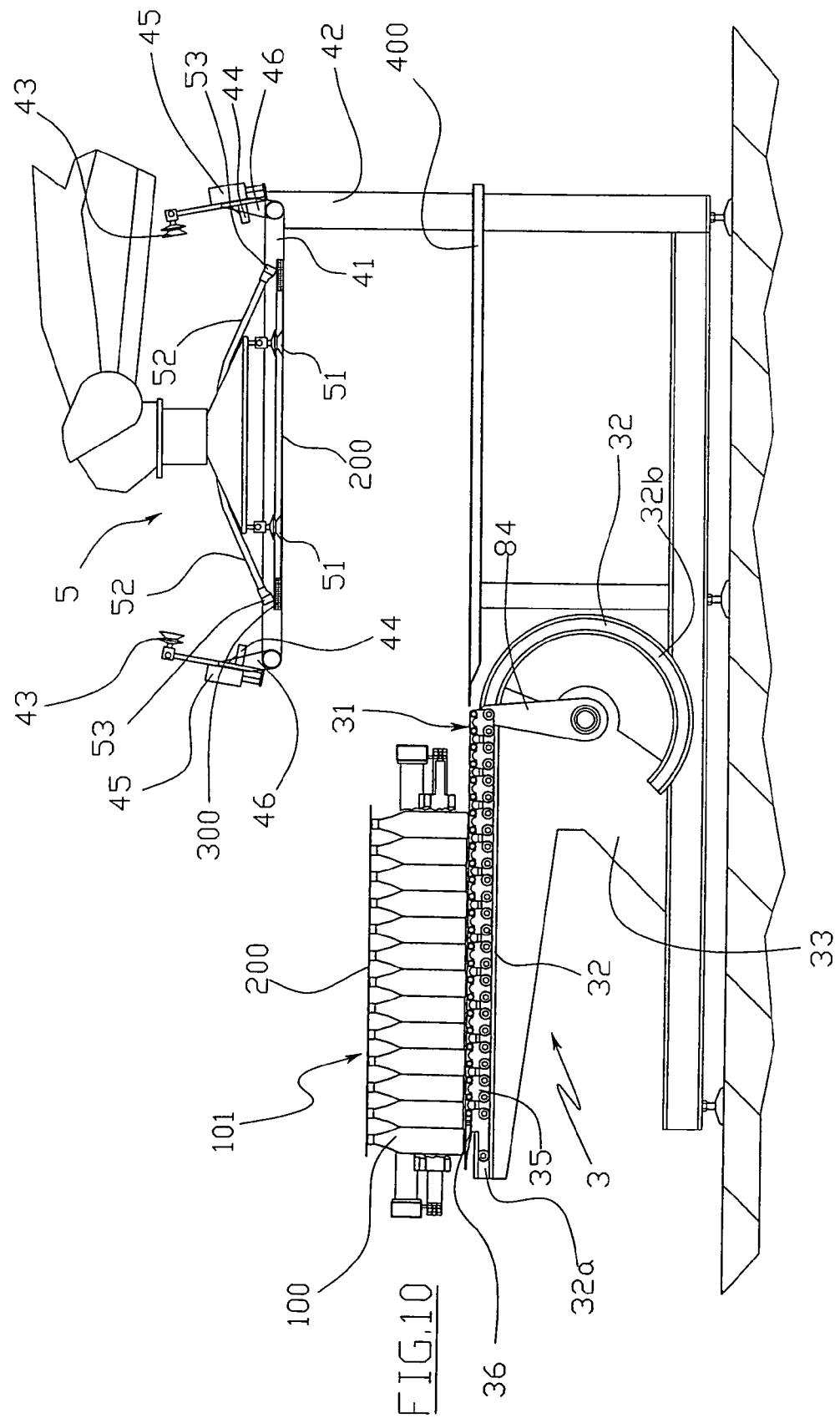

FIG. 10: the layer 101 of bottles 101 is translated onto the sliding plane 31 of the support body 3, which slides in the throats 32, activated by the actuation means 34, towards the laid out position, moving in the same direction and at the same speed as the translator-centrer 6, so as to load the plane 31 without sliding. At the same time, the robot 5 arranges the covering layer 200 and the framework 300 in the frame 41. The arms 46 that come away from the side of the frame 41 are lifted so as not to hinder the correct arrangement of the covering layer 200 with framework 300.

Figure 11:
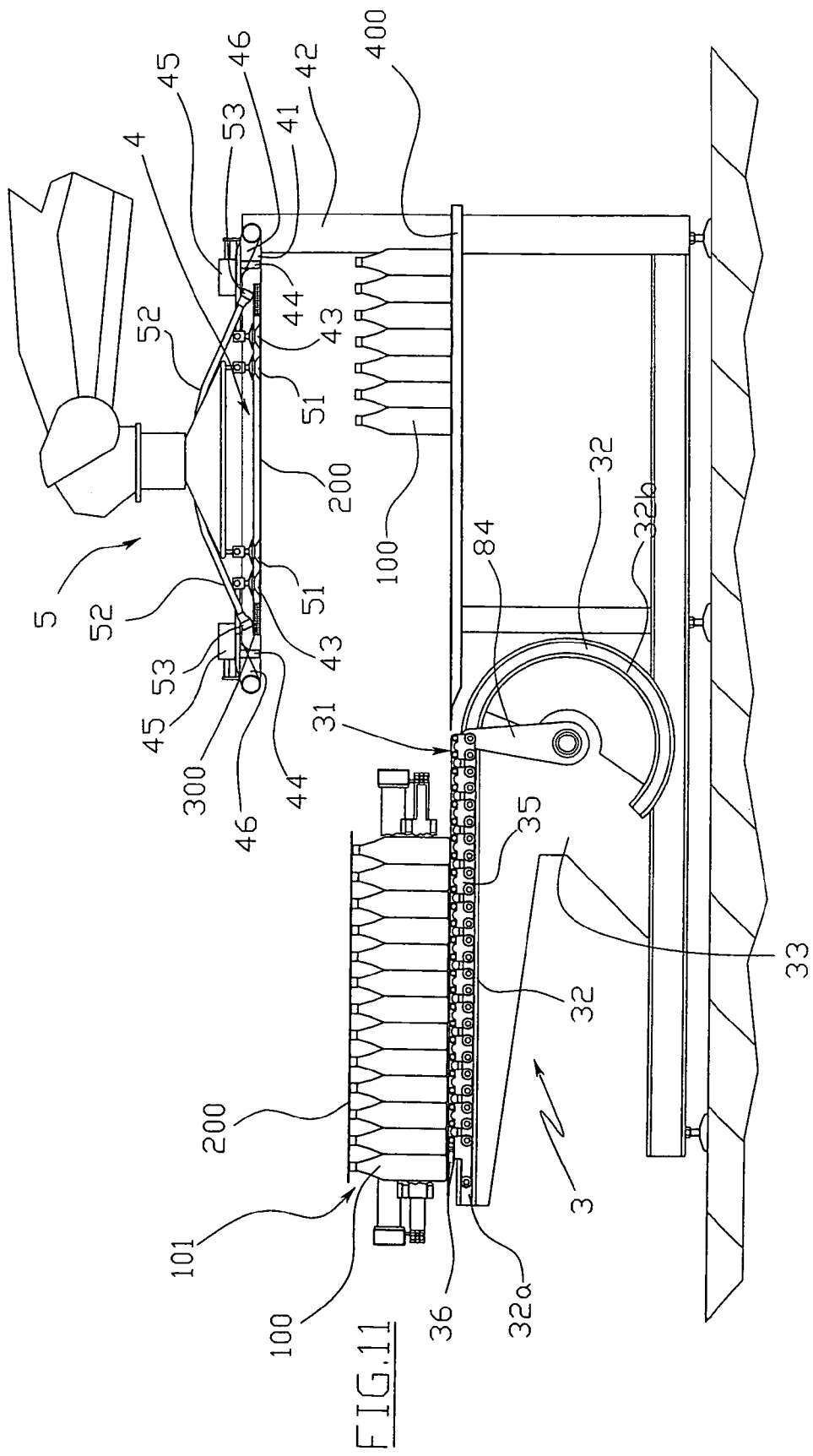

FIG. 11: the arms 46 go down, rotating, to take the suckers 43 onto the surface of the covering layer 200 and the blocks 44 onto the flanks of the framework 300. At the same time, a new group of bottles 100 to form a new layer 101 arrives on the plane 400 at the bottom of the frame 41, which stays in the high position.

Figure 12:
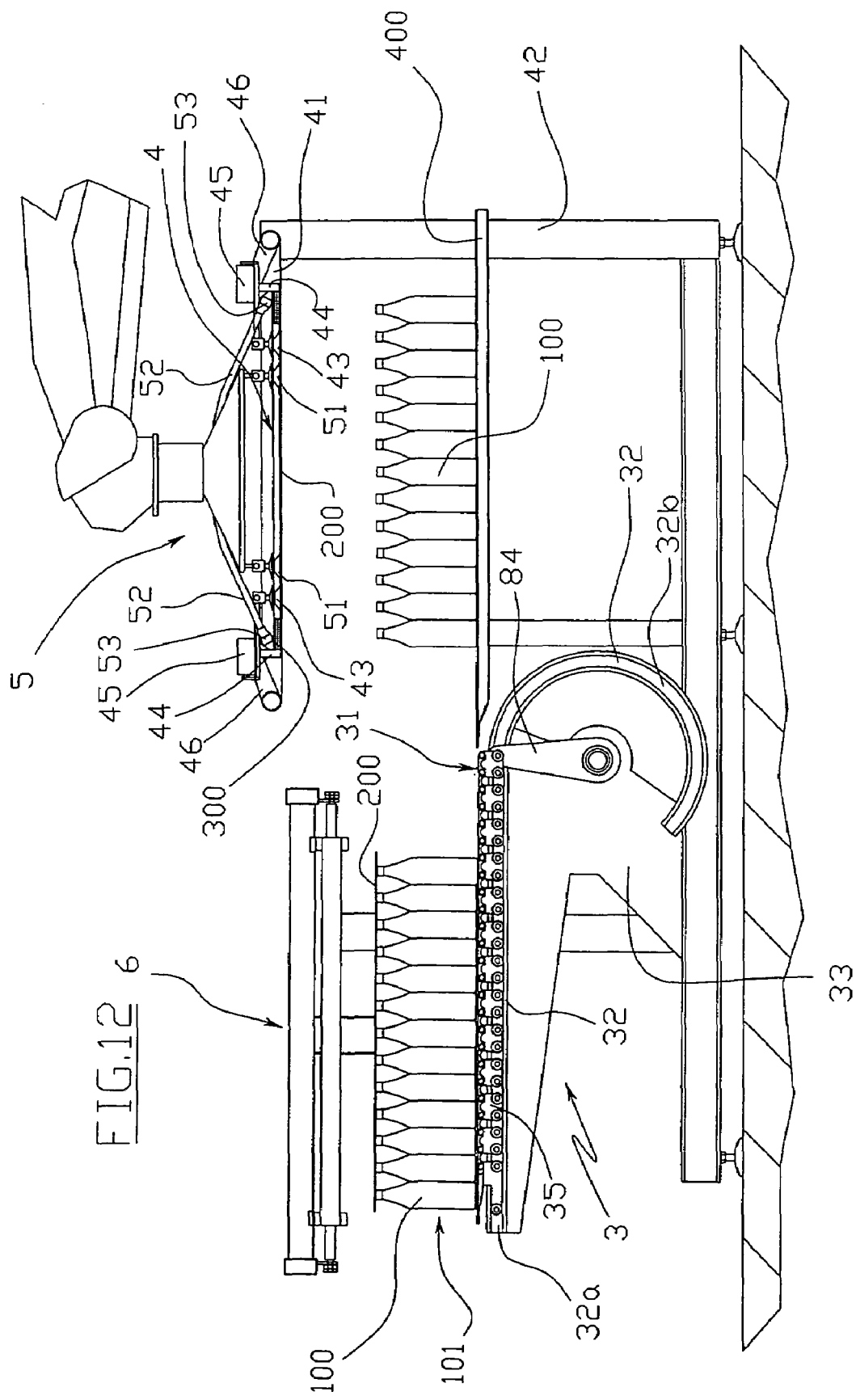

FIG. 12: the suckers 43 support the covering layer 200 and the blocks 44 are arranged in abutment against the framework 300, actuating the jacks 45; the robot 5 releases the grip of its suckers 51, freeing the covering layer 200 and opens the arms 52 freeing the framework. In this way the transfer of the covering layer 200 and of the framework 300 from the robot 5 to the store 4 takes place. At the same time, the translator-centrer 6 goes up leaving the layer 101 of bottles 100, with the covering layer 200 above, on the sliding plane 31 of the support body 3. In the meantime, the new group of bottles 100 is completed and waits below the store 4, which is still in the high position.

Figure 13:
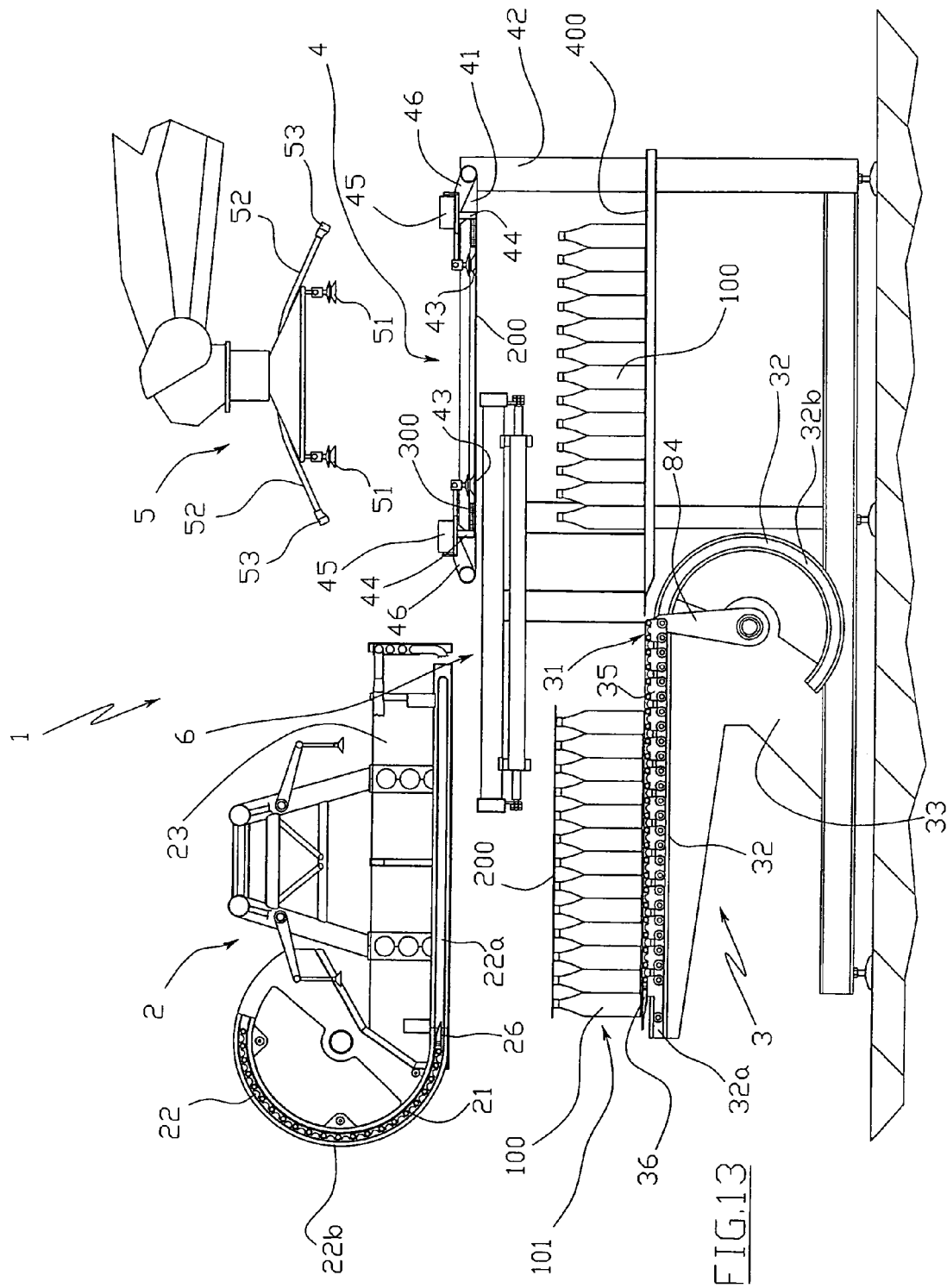

FIG. 13: the robot 5 that is now unloaded (without covering layer and/or framework) moves away from the store 4 to pick up a new covering layer. The covering layer 200 and the framework 300 previously released are held by the store 4. At the same time, the translator-centrer 6 translates towards the collection plane 400 going between the frame 41 of the store 4 and the group of bottles 100 that is waiting on the plane 400.

Figure 14:
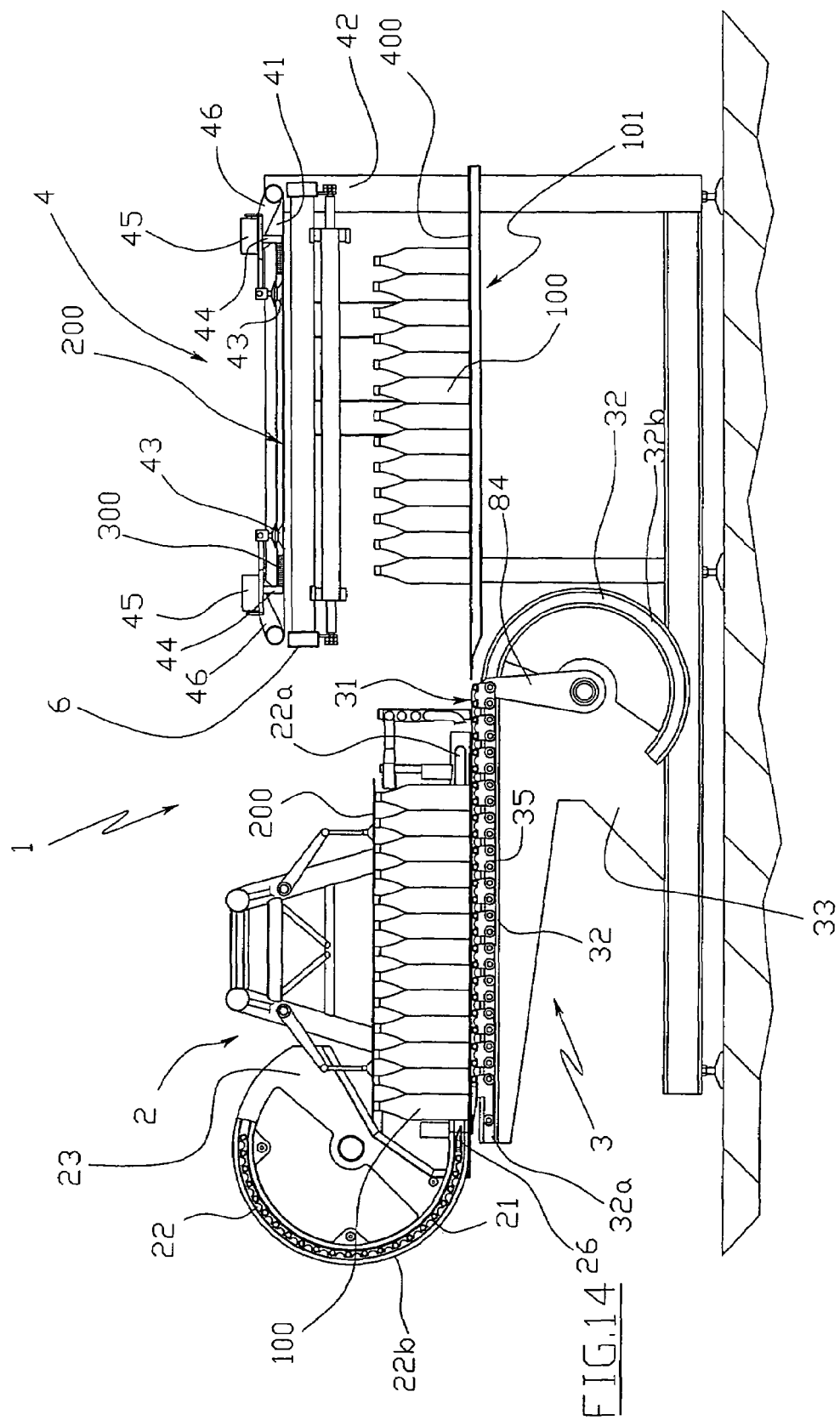

FIG. 14: the moving head 2 goes above the support body 3 to transfer the layer 101 of bottles 100 from the plane 31 of the support body 3 to the plane 21 of the moving head 2. Such a transfer takes place through the exchange of the two planes 21 and 31 that slide, in synchrony, below the layer 101. The plane 21 of the head 2 goes from the collection position to the laid out position, the latter not shown, whereas the plane 31 of the support body 3 goes back from the laid out position to the collection position, the latter not shown. Such an operation is carried out keeping the free ends 26, 36 of the planes 21, 31 always in abutment, so as to avoid the layer 101 of bottles 100 falling. Basically, as the plane 21 of the moving head 2 is gradually laid out flat, the plane 31 of the support body 3 folds up and the plane 21 takes the place of the plane 31 arranging itself below the layer 101 to be palletized. At the same time, the translator-centrer 6 goes immediately to the bottom of the frame 41, staying above the layer 101 of bottles 100.

Figure 15:
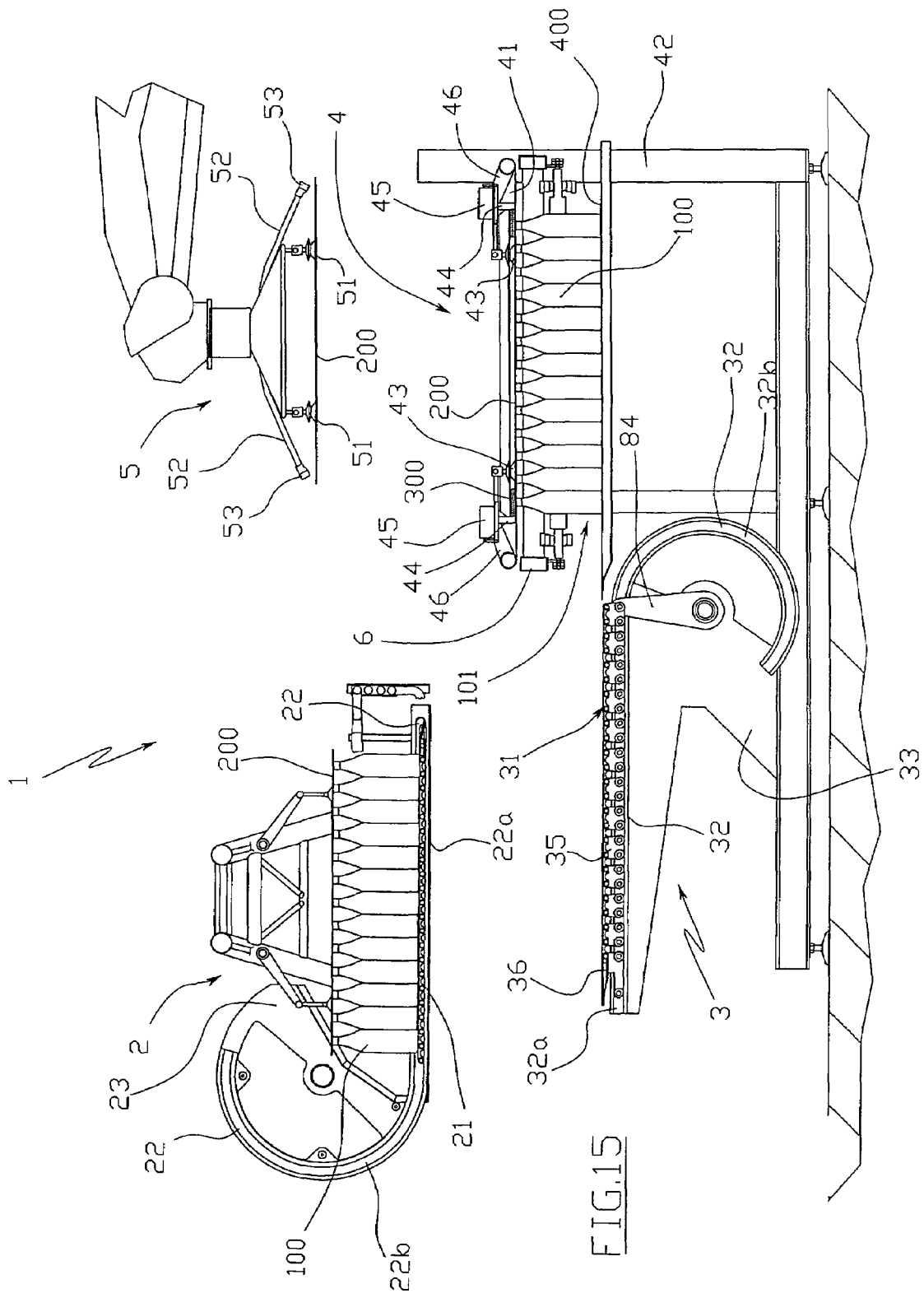

FIG. 15: once the transfer of the layer 101 of bottles 100 onto the plane 21 has been carried out, the moving head 2 moves away from the support body 3 to take the layer 101 of bottles 100 with the covering layer 200 on top into the palletization zone. As soon as a new layer 101 of bottles 100 has been formed, the translator-centrer 6 vertically descends and with it the store 4 also descends in synchrony, which releases the covering layer 200 and the framework 300 actuating the valves and the jacks 45, to then immediately go back into the high position to receive a new covering layer 200. At the same time, the robot 5 has already picked up a new covering layer 200 and goes towards the store 4.

Figure 16:
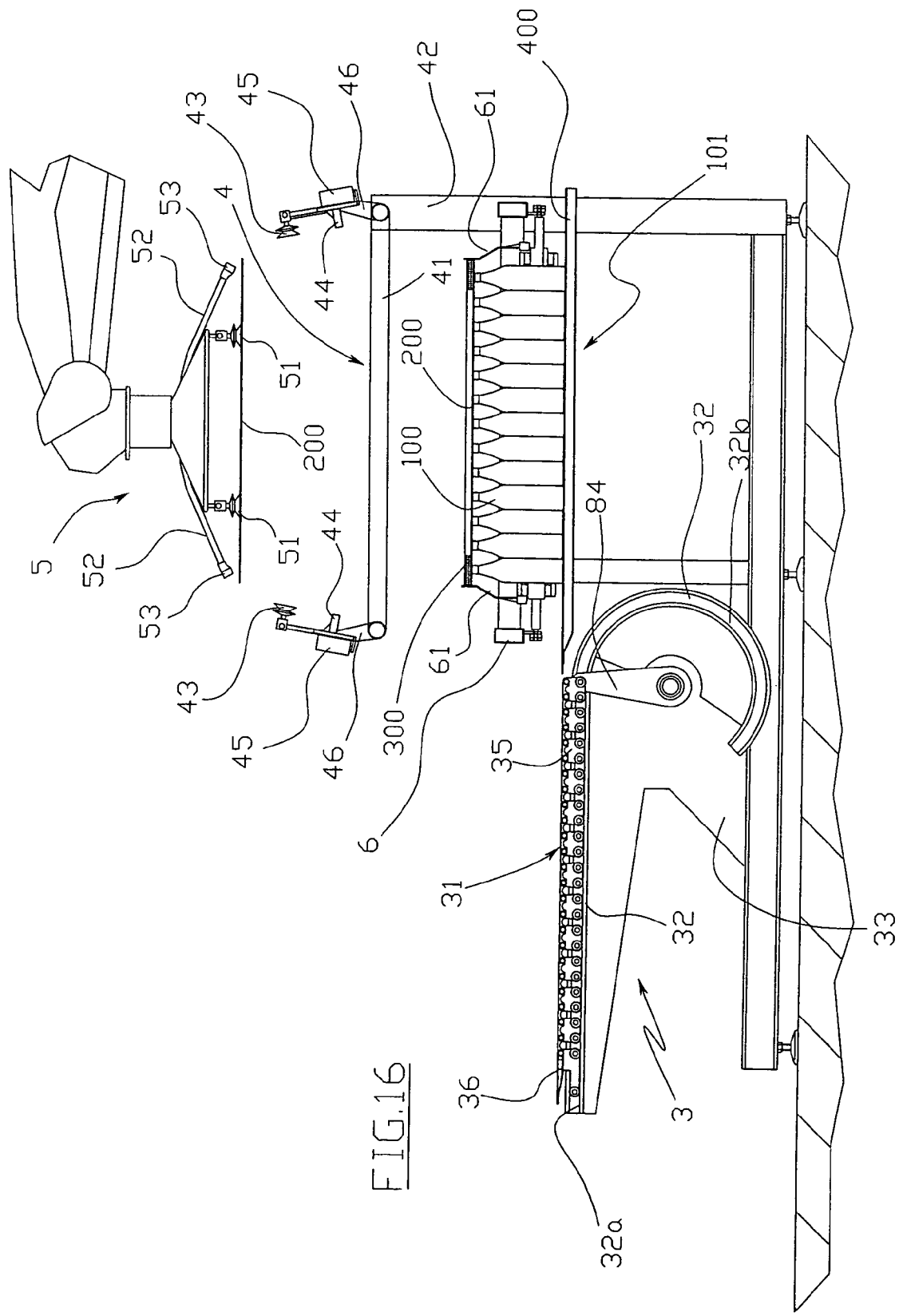

FIG. 16: the translator-centrer 6 continues its descent and compacts the layer of bottles 100 with the covering layer 200 and the framework 300 on top. The store 4 is already in its high position and the arms 46 are rotated to take the suckers 43 and the blocks 44 outside working area, to receive a new covering layer 200 from the robot 5. In order to prevent the covering layer 200 and the framework 300 arranged above the layer 101 of bottles 100, that translate on the support body 3, from sliding it is foreseen to use suitable mobile locking means, in the example a pair of opposite abutment wings 61 that can be actuated through an articulated quadrilateral system associated with the translator-centrer 6 itself.

FIG. 17: the group of bottles 100, in the example forming the last layer 101, is pushed onto the sliding plane 31 of the support body 3, keeping the covering layer 200 and the framework 300 locked. At the same time, the robot 5 releases the new covering layer 200 in the frame 41 to start a new pallet.

All of the operations just described are carried out in a coordinated manner, in particular, the store 4 operates independently with respect to the translator-centrer 6 with the exception of the step in which the covering layer and/or 1*a* framework must be laid down onto the layer 101. Indeed, during this operation, the store 4 descends onto the layer 101 together with the translator-centrer 6, to then immediately go up as soon as the covering layer and/or the framework are released, making itself available to receive a new covering layer and/or framework.

In practice, the store 4 is always in the high position where it can receive the covering layer and/or the framework, contributing to substantially reducing the palletization times.

Moreover, thanks to the store 4, which is almost always in high position, suitable for receiving and holding the covering layer and/or the framework, the robot 5 having finished the delivery to the store 4 can be used, in the available time, to carry out other operations necessary for palletization, like for example providing a new pallet.

As can be appreciated from what has been described, the method and the system for the quick palletization of objects according to the present invention allow the requirements to be satisfied and the drawbacks mentioned in the introductory part of the present description with reference to the prior art to be overcome.

Indeed, the method and the system of the present invention allow many operations to be carried out simultaneously without the need to wait for the previous step to be completed, consequently speeding up the entire palletization process.

Of course, a man skilled in the art can make numerous modifications and variations to the method and to the system for the quick palletization of objects described above, in order to satisfy contingent and specific requirements, all of which are also covered by the scope of protection of the invention, as defined by the following claims.

The invention claimed is:

1. A method for the quick palletization of objects (100), comprising the steps of:
    arranging objects (100) to be palletized organized in a layer on a collection surface (400);
    loading said layer of objects (100) onto a first flexible support surface (31) by reciprocating the first flexible support surface (31) in a direction of transfer of the objects (100) between 1) a retracted position under the collection surface, and 2) an extended position substantially coplanar to the collection surface (400) and in continuation of the collection surface (400), so that the first flexible support surface (31) receives said objects without sliding;
    wherein said first flexible support surface (31) is configured to slide in a first pair of opposite parallel guides (32) consisting of a horizontal portion (32*a*) and a circumferential portion (32*b*) adjacent to each other;
    transferring said layer of objects (100) from the first flexible support surface (31) to a second flexible moving surface operable as a transfer surface (21), comprising sliding said second flexible moving surface (21) between 1) a retracted position, in which said second flexible moving surface (21) is coplanar with the first flexible support surface (31) and in continuation of the first flexible support surface (31) when said first flexible support surface (31) is in the extended position, and 2) an extended position, in which said second flexible moving surface (21) is in continuation of the first flexible support surface (31) when said first flexible support surface is in the retracted position, so as to replace the support surface (31) below the objects (100) when said objects remain stationary, wherein said transferring takes place by synchronously activating the harmonious sliding of the first flexible support surface (31) and the second flexible moving surface (21) arranged in contact with each other so as to be in continuation of one another;
    wherein said second flexible moving surface (21) is configured to slide in a second pair of opposite parallel guides (22) consisting of a horizontal portion (22*a*) and a circumferential portion (22*b*) adjacent to each other; and wherein said first flexible support surface and said second flexible moving surface each comprise a roll-up curtain comprising a plurality of rollers having interconnected ends, the rollers defining a layer support surface and said ends traversing the parallel guides, each of said opposite parallel guides having a linear portion defining said support surface and a circular track adjacent to said linear portion;
    transferring the second flexible moving surface (21) with the layer of objects (100) above a pallet; and
    making the second flexible moving surface (21) slide to the retracted position under the objects (100), kept stationary, to transfer said objects onto the pallet.

2. The method according to claim 1, further comprising actuating a translator-centrer (6) to translate said objects (100) to load said objects (100) onto the first flexible support surface (31) in synchrony with the sliding of the first flexible support surface (31).

3. The method according to claim 2, further comprising compacting said objects (100) by the translator-centrer (6) so as to form a layer (101) before being loaded onto the first flexible support surface (31).

4. The method according to claim 3, further comprising releasing at least one covering layer (200) or a framework (300) onto said layer (101) through a storage station (4), before being loaded onto the first flexible support surface (31).

5. The method according to claim 4, moving said storage station (4) between 1) a first position in which said storage station (4) receives and holds the at least one covering layer (200) or said framework (300) and a second position in which said storage station (4) releases the at least one covering layer (200) or said framework (300) onto the layer (101), the passage from the first to the second position being carried out with rectilinear motion.

6. The method according to claim 5, wherein when said storage station (4), is in said first position, said storage station (4) is located outside a working area with respect to a working zone of the translator-centrer (6) that loads the layer (101) onto the first flexible support surface (31).

7. The method according to claim 6, further comprising receiving and holding, at the storage station (4), during the loading of the layer (101) onto the first flexible support surface (31) through the translator-centrer (6), the at least one covering layer (200) or said framework (300).

8. The method according to claim 7, wherein said translator-centrer (6) secures the at least one of said covering layer (200) or said framework (300) in a fixed position, wherein said translator-centrer (6) includes mobile locking means (61), and wherein said mobile locking means (61) locks the at least one covering layer (200) or said framework (300) during the loading of the layer (101) onto the support surface (31).

9. The method according to claim 1, further comprising drawing, via said collection surface (400), the objects (100) in a direction parallel to the sliding of the first flexible support surface (31).

10. A system (1) for the quick palletization of objects comprising:
a first pair of opposite parallel guides (32) consisting of a horizontal portion (32a) and a circumferential portion (32b) adjacent to each other;
a first flexible support surface (31) configured to slide in said first pair of opposite parallel guides (32), wherein said first flexible support surface (31) occupies the horizontal portion (32a) to support a load of objects (100) to be palletized;
a second pair of opposite parallel guides (22) consisting of a horizontal portion (22a) and a circumferential portion (22b) adjacent to each other;
a second flexible moving surface (21) operable as a transfer surface configured to slide in said second pair of opposite parallel guides (22), said first flexible support surface (31) and said second moving flexible surface (21) being configured so as to be able to transfer said objects (100) from the first flexible support surface (31) to the second flexible moving surface (21) by activating sliding of the first flexible support surface and the second flexible moving surface in synchrony with one another, said second flexible moving surface (21) being suitable for moving said objects (100) towards a palletization zone, wherein the first and second pairs of parallel guides of the first flexible support surface and the second flexible moving surface each have free ends spaced apart from one another; and
activation means for activating the first flexible support surface (31) for reciprocating between a retracted position and an extended position in the direction of transfer of the objects, and for activating the second flexible moving surface (21) between a retracted position in which said second flexible moving surface (21) is coplanar with the first flexible support surface (31) and in continuation of the extended first flexible support surface, and an extended position in which said second flexible moving surface (21) is in continuation of the first flexible support surface (31) while the first flexible support surface (31) is in the retracted position;
wherein said first flexible support surface and said second flexible moving surface each comprise a roll-up curtain comprising a plurality of rollers having interconnected ends, the rollers defining a layer support surface and said ends traversing the parallel guides, each of said opposite parallel guides having a linear portion defining said support surface and a circular track adjacent to said linear portion.

11. The system (1) according to claim 10, further comprising a frame structure (33) of a support body (2) suitable for being fixed to the floor on which said first pair of guides (32) is formed.

12. The system (1) according to claim 10, further comprising a frame structure (23) of a moving head (2) suitable for being fixed to a moving system on which said second pair of guides (22) is formed.

13. The system (1) according to claim 10, wherein said moving head (2) comprises perimetric containment means (25) suitable for preventing objects (100) being drawn during the harmonious sliding of the surfaces (21, 31).

14. The system (1) according to claim 10, wherein a separation between the guides (32) forming the first pair of guides is less than a separation between the guides (22) forming the second pair of guides.

15. The system (1) according to claim 10, in which each of said support surface (31) and moving surface (21) are provided on respective free ends thereof with a matching element suitable for cooperating in abutment during harmonious sliding of the support surface (31) and the moving surface (21) for the transfer of the objects (100) from the support surface (31) to the second flexible moving surface (21).

16. The system (1) according to claim 10, further comprising a thrusting arm (7) for loading the first flexible support surface (31) with the objects (100) to be palletized.

17. The system (1) according to claim 10, further comprising:
pick-up means (5) for picking up at least one covering layer (200) or a framework (300),
a storage station (4) for receiving from said pick-up means (5) and for holding said at least one covering layer (200) or the framework (300), said station (4) being movable by rectilinear motion between a first position in which said station (4) receives said at least one covering layer (200) or the framework (300) and a second position in which said station (4) releases the at least one covering layer (200) or the framework (300) above said objects (100) to be palletized.

18. The system (1) according to claim 17, wherein said station (4) comprises a vertically mobile frame (41), slidably fixed to an upright (42), said frame (41) comprising:
first means (43) for holding and releasing said covering layer (200); and
second means (44) for holding and releasing said framework (300).

19. The system (1) according to claim 18, wherein said first means for holding and releasing said covering layer (200) comprise a plurality of suckers (43) suitable for sticking to the surface of a covering layer (200).

20. The system (1) according to claim 19, wherein each sucker (43) is hinged to said frame (41).

21. The system (1) according to claim 18, wherein said second means for holding and releasing said framework (300) comprise a plurality of blocks (44) suitable for interfering with at least two opposite portions of the framework (300), so as to hold said framework (300).

22. The system (1) according to claim 21, wherein each block (44) is hinged to said frame (41) and actuated to translate through a jack (45).

23. The system (1) according to claim 20, further comprising a translator-centrer (6) for loading the first flexible support surface (31) with the objects to be palletized, and for defining a predetermined amount of objects (100) to be loaded.

24. The system (1) according to claim 23, wherein mobile locking means (61), for keeping the at least one of said covering layer (200) or said framework (300) supported above said objects (100), said mobile locking means (61) being associated on said translator-centrer (6) in a fixed position.

25. The system (1) according to claim 24, wherein said locking means comprise a pair of opposite mobile abutment wings (61), which can be actuated through an articulated quadrilateral system.

26. A system (1) for the quick palletization of objects comprising:
- a first pair of opposite parallel guides (22) consisting of a horizontal portion (32*a*) and a circumferential portion (32*b*) adjacent to each other;
- a first flexible support surface (31) configured to slide in said first pair of opposite parallel guides (32), wherein said first flexible support surface (31) occupies the horizontal portion (32*a*) to support a load of objects (100) to be palletized;
- a second pair of opposite parallel guides (22) consisting of a horizontal portion (22*a*) and a circumferential portion (22*b*) adjacent to each other;
- a second flexible moving surface (21) operable as a transfer surface configured to slide in said second pair of opposite parallel guides (22), said first flexible support surface (31) and said second moving flexible surface (21) being configured so as to be able to transfer said objects (100) from the first flexible support surface (31) to the second flexible moving surface (21) by activating sliding of the first flexible support surface and the second flexible moving surface in synchrony with one another, said second flexible moving surface (21) being suitable for moving said objects (100) towards a palletization zone, wherein the first and second pairs of parallel guides of the first flexible support surface and the second flexible moving surface each have free ends spaced apart from one another; and
- activation means for activating the first flexible support surface (31) for reciprocating between a retracted position and an extended position in the direction of transfer of the objects, and for activating the second flexible moving surface (21) between a retracted position in which said second flexible moving surface (21) is coplanar with the first flexible support surface (31) and in continuation of the extended first flexible support surface, and an extended position in which said second flexible moving surface (21) is in continuation of the first flexible support surface (31) while the first flexible support surface (31) is in the retracted position,
- wherein said first flexible support surface (31) and said second flexible moving surface (21) each comprise a plurality of rigid rods (70) parallel to each other and transversal with respect to the direction of sliding so as to make said first flexible support surface and said second flexible moving surface flexible.

\* \* \* \* \*